US011018469B2

(12) United States Patent
Lang

(10) Patent No.: US 11,018,469 B2
(45) Date of Patent: May 25, 2021

(54) CURRENT COLLECTOR AND CONDUCTOR LINE SYSTEM

(71) Applicant: Conductix-Wampfler GmbH, Weil am Rhein (DE)

(72) Inventor: Dietmar Lang, Schliengen (DE)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 289 days.

(21) Appl. No.: 16/194,592

(22) Filed: Nov. 19, 2018

(65) Prior Publication Data

US 2019/0165531 A1 May 30, 2019

(30) Foreign Application Priority Data

Nov. 28, 2017 (DE) .................... 10 2017 128 173.8

(51) Int. Cl.
*H01R 39/40* (2006.01)
*H01R 39/38* (2006.01)
*B60L 5/08* (2006.01)
*B60L 5/40* (2006.01)
*H01R 39/02* (2006.01)

(52) U.S. Cl.
CPC .............. *H01R 39/381* (2013.01); *B60L 5/08* (2013.01); *B60L 5/40* (2013.01); *H01R 39/025* (2013.01); *H01R 39/40* (2013.01)

(58) Field of Classification Search
CPC ...... B60L 5/08; B60L 5/40; B60L 5/38; B60L 5/19; B60L 5/22; B60L 5/30; H01R 39/025; H01R 39/381; H01R 39/40; B60M 1/12
See application file for complete search history.

(56) References Cited

U.S. PATENT DOCUMENTS

| 976,942 A | 11/1910 | Speck et al. |
| 1,528,372 A * | 3/1925 | Gouty .................. B60L 5/08 |
| | | 191/59.1 |

(Continued)

FOREIGN PATENT DOCUMENTS

| CH | 584116 A5 | 1/1977 |
| DE | 9103696 U1 | 8/1991 |

(Continued)

OTHER PUBLICATIONS

Search result of examination report for DE 10 2017 128 173.8 filed Nov. 28, 2017.

(Continued)

*Primary Examiner* — Mark T Le
(74) *Attorney, Agent, or Firm* — Paul D. Bianco; Gary S. Winer; Fleit Intellectual Property Law

(57) ABSTRACT

A current collector and a conductor line system having such a current collector. The current collector has a holder and a carbon brush arranged in carbon brush support movable relative to holder in a feed direction from and to the conductor line. The carbon brush is movable in a feed direction from and to conductor line. A better and reliable guiding of the carbon brush on the conductor line and simpler design of the current collector, uses a current collector in which the carbon brush is additionally movable in a transverse direction running essentially across the longitudinal direction, a spring element being provided between the carbon brush and holder.

11 Claims, 4 Drawing Sheets

(56) References Cited

U.S. PATENT DOCUMENTS

| | | | | |
|---|---|---|---|---|
| 2,005,908 | A | * | 6/1935 | Schaake .................... B60L 5/08 |
| | | | | 191/59.1 |
| 4,221,282 | A | * | 9/1980 | Wampfler ................. B60L 5/38 |
| | | | | 191/68 |
| 4,464,546 | A | * | 8/1984 | Culver ...................... B60L 5/08 |
| | | | | 191/49 |
| 2014/0110205 | A1 | * | 4/2014 | Dronnik ................. B60L 53/32 |
| | | | | 191/59.1 |
| 2017/0057359 | A1 | | 3/2017 | Lang |
| 2017/0349049 | A1 | | 12/2017 | Lang et al. |

FOREIGN PATENT DOCUMENTS

| | | |
|---|---|---|
| DE | 102015101848 A1 | 8/2016 |
| DE | 102015101849 A1 | 8/2016 |
| GB | 487923 A | 6/1938 |
| JP | S55-25753 U | 2/1980 |

OTHER PUBLICATIONS

Extended European Search Report dated May 14, 2019 for European Application No. 18202078.

\* cited by examiner

CURRENT COLLECTOR AND CONDUCTOR LINE SYSTEM

FIELD OF THE DISCLOSURE

The disclosure concerns a current collector and a conductor line system.

BACKGROUND

DE 10 2015 101 849 A1 discloses a conductor line system with a current collector for an electrical load movable along a conductor line in a direction of travel having at least two contact strips arranged one behind the other in the travel direction on a rocker, the rocker being mounted on a tilt arm around an axis of rotation running perpendicular to the travel direction, through which the rocker is movable toward the conductor strand for contacting the contact strips with an electrically conducting conductor strand of the conductor line. The rocker has a tilt arm on which a spring arm slides, which is tightened during deflection of the rocker from a rest position and forces the rocker into the rest position. This current collector does permit reliable forcing of the carbon brush against the conductor line in its feed direction, but movements of the carbon brush across the longitudinal direction and deviating from the feed direction cannot be compensated for so that the carbon brush during operation, under some circumstances, is continuously forced against a side wall of the conductor profile of the conductor line and is therefore worn on one side and in the worst case may even break. With the carbon brush lying against the conductor line on one side there is also the hazard of tilting, especially when traveling over the interfaces between two conductor line sections. When arranged in the conductor line, the carbon brush must also be very precisely positioned, since lateral offset can hardly be compensated for at all.

GB 487 923 discloses a current collector design for a contact wire for a trolley bus in which a sliding contact can be rotated around three geometric axes of rotation perpendicular to one another. In order to prevent the current collector from jumping away from the overhead contact line, it is prescribed that the sliding contact there can oscillate around an axis running parallel to the contact wire and above it. In this way the sliding contact can properly compensate for movement of the oscillating contact wire.

CH 584 116 discloses a current collector for trolley buses having a current collector rod, a sliding shoe support and a sliding shoe intended to contact a contact wire, in which at least one torsion spring element is provided between the current collector rod and the sliding shoe to dampen horizontal and/or vertical jolts, impacts and vibrations acting on the sliding shoe.

This torsion spring element permits only slight deviations and serves mostly to dampen jolts acting on the sliding shoe.

DE 91 03 696.8 discloses fastening with low mechanical stress of an electrically conducting contact strip intended for the transfer of electrical currents and firmly connected to a metal base on a rigid support using a fastening element, like screws, nuts or rivets, which are anchored on the metal base firmly connected to the contact strip and guided by holes situated in the rigid support and are fastened on the side of the rigid support facing away from the contact strip. In order to enable fastening of an electrically conducting carbon brush part firmly connected to a metal holder using a rigid support in which no adverse effect on strength or ruptures of the contact strip occur as a result of temperature change, it is prescribed that the fastening elements there be provided with spring elements that are tightened between the ends of the fastening elements facing away from the contact strip as one abutment and a rigid support as a second abutment. The contact strip is then movable only in the feed direction and not in the direction transverse to it owing to fastening to the support.

U.S. Pat. No. 976,942 discloses a current collector for a trolley bus that is held in a central mean position by two oppositely acting springs. The design necessary for this purpose is demanding and always requires two abutments for the oppositely acting spring elements.

SUMMARY

One aspect of the disclosure relates to a current collector and a conductor line system that overcome the aforementioned drawbacks and permit better and reliable guiding of the carbon brush on a conductor line as well as a simpler design of a current collector.

Advantageous modifications and embodiments are also disclosed.

The current collector according to at least some embodiments of the disclosure has a carbon brush that is additionally movable in a transverse direction running essentially across the longitudinal direction, a spring element being provided between the carbon brush and the holder. Through the spring element the carbon brush can be advantageously held in a normal position in the transverse direction, the spring element permitting, on the one hand, deflection of the carbon brush in the transverse direction from the normal position, while, on the other hand, pulling the carbon brush back in the direction of the normal position.

The transverse direction can preferably deviate only a few degrees, specifically a maximum of 6°, from the direction exactly perpendicular to the longitudinal direction. The carbon brush can then be aligned in the longitudinal direction and extend along the greatest length in the longitudinal direction. The longitudinal direction can then preferably coincide with the movement direction of the carbon brush and current collector.

The spring element can advantageously be arranged on the carbon brush support so as to facilitate replacement of the carbon brush as it wears out during operation. The spring element can also act in a first spring section mostly in the feed direction and/or via compression. Movement in the feed direction can be facilitated on this account, and approach or separation between the carbon brush and the conductor line caused by changes in distance between the movable loads and the conductor line is better compensated for. A larger stroke of the first spring section can then preferably be achieved.

The spring element can also advantageously act in a second spring section mostly in the transverse direction and/or via tension. In this way, deflections of the carbon brush from its normal position that occur mostly in the transverse direction, especially on or in the conductor line, can be better compensated for. Thus, slack in the conductor line in the area between two fastenings of the conductor line through deflection of the carbon brush from its normal position in the transverse direction can be compensated for without having to reposition the entire current collector.

Decoupling of functions (compensation of movements in the transverse direction and feed direction) can be achieved in a simple and compact manner using two spring sections having different spring properties.

The carbon brush and/or carbon brush support can also advantageously have at least one guide element extending in the feed direction in order to provide improved guiding in the feed direction. The guide element can then be movable in the feed direction using a guide in the holder. Stopping of the guide element can also preferably coincide with counterstopping of the guide lying in the feed direction closer to the carbon brush in order to limit the maximum movement in the feed direction toward the carbon brush.

Preferably, there can be play in the transverse direction between the guide element and spring element in order to permit transverse movements while also limiting them by adjusting this transverse play. The play in the transverse direction can advantageously be greater than the play between the guide element and spring element in the longitudinal direction so that, at the same time, the least possible diversion or tilting of the carbon brush is achieved in the longitudinal direction.

The spring element can enclose the guide element in an advantageous compact embodiment. The spring element and the guide element can then have a different cross-section from each other, the spacing between the guide element and the spring element being greater in the transverse direction than in the longitudinal direction. The spring element can also advantageously have a circular cross-section and the guide element a cross-section deviating from circular, in which case the distance between the guide element and the spring element in the transverse direction is greater than in the longitudinal direction. The width of the guide element in the transverse direction is then advantageously less than the length of the guide element in the longitudinal direction. The most accurate possible and satisfactory guiding can be achieved in the longitudinal direction and feed direction and deflection in the transverse direction improved using the above embodiments.

The spring element can also be at least partially arranged in the guide and be supported on at least one side on the holder so that good lateral guiding of the spring element is achieved in the area within which it is arranged in the guide, whereas the parts protruding from the guide remain more freely movable. The first spring section can preferably run fully or for the most part in the guide, whereas the second spring section runs fully or for the most part outside the guide.

The feed direction can advantageously run essentially perpendicular to the longitudinal direction, whereas, in addition or as an alternative, the transverse direction runs essentially perpendicular to the longitudinal direction and/or to the feed direction. "Perpendicular" or "transverse" as used in conjunction with the present definition also includes a certain deviation from the mathematically strict definition, i.e., deviations caused by tolerances, imprecise manufacture or assembly or through operating conditions or wear also fall under the definition of "perpendicular" or "transverse".

The conductor line system according to at least some embodiments of the disclosure has a carbon brush that is additionally movable in a transverse direction running essentially across the longitudinal direction, a spring element being provided between the carbon brush and the holder. The conductor line system can preferably be designed as described above and subsequently and as depicted in the drawings.

BRIEF DESCRIPTION OF THE DRAWINGS

The disclosure is described below by means of detailed practical examples with reference to the accompanying drawings. In the drawings.

DETAILED DESCRIPTION

Figures 1, 2:
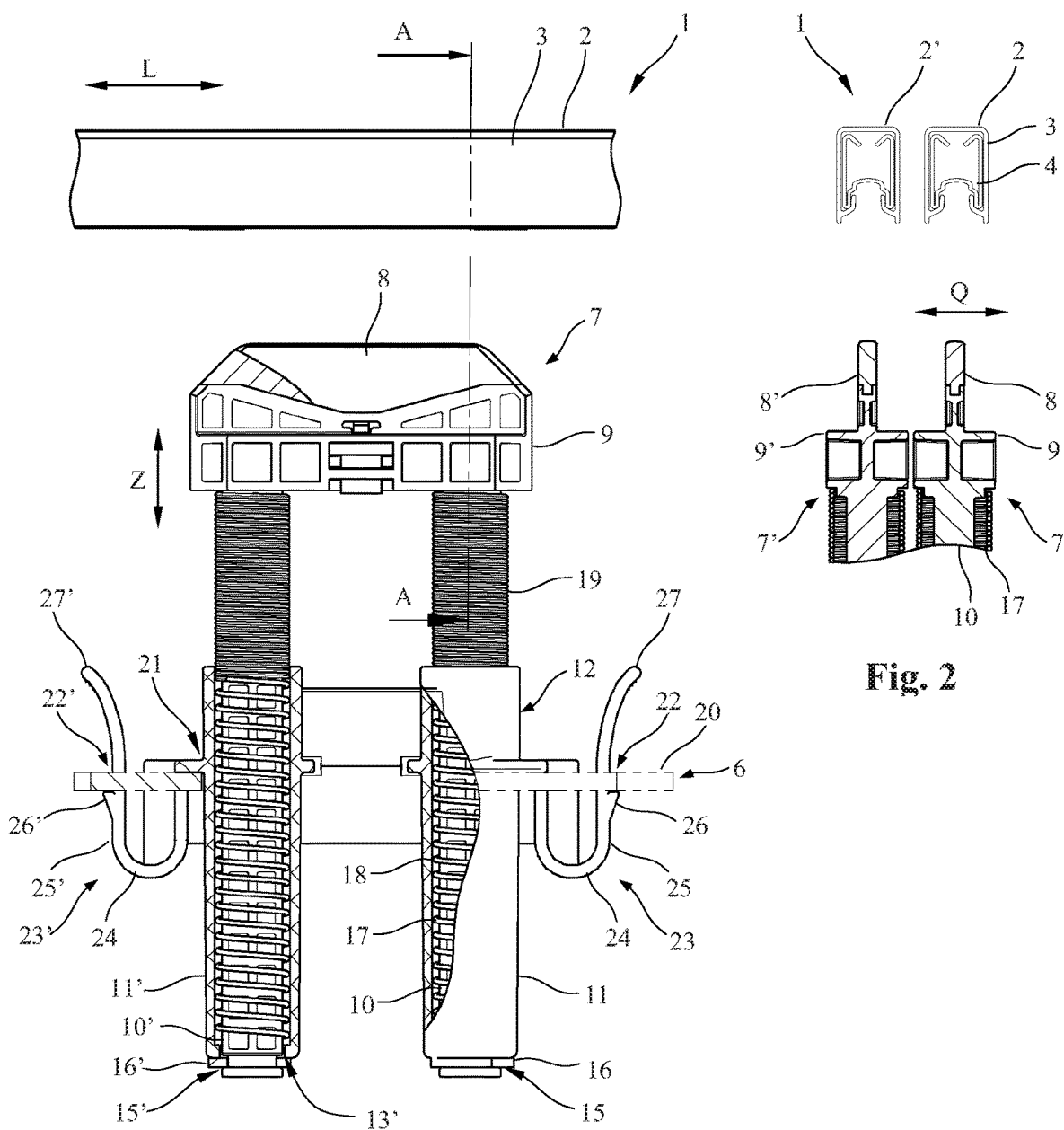
FIG. 1 shows a side view of a conductor line system according to the disclosure having a current collector according to the disclosure in a normal position separated from a conductor line.
FIG. 2 shows a sectional view through the conductor line and the current collector along line A-A in FIG. 1.

FIG. 1 shows a side view of a section of a conductor line system 1 according to the disclosure having a conductor line 2 running in the longitudinal direction L. The conductor line 2 has an elongated insulation profile 3 open on one side that encloses an elongated, electrically conducting phase conductor profile 4 having an embedded electrically conducting elongated sliding surface 5 preferably made of aluminum or steel.

An electrical load 6 indicated only in the drawing can be moved along conductor line 2 having a current collector 7 arranged on it. The current collector 7 serves to supply the electrical load and the electrical equipment installed on it, for example, an electric monorail conveyor or a container crane having different electric travel and lifting drives.

An additional conductor line 2' as well as additional current collector 7' arranged next to the conductor line 2 and the current collector 7 are designed accordingly such that the comments concerning conductor line 2 and current collector 7 apply accordingly.

Figure 3:
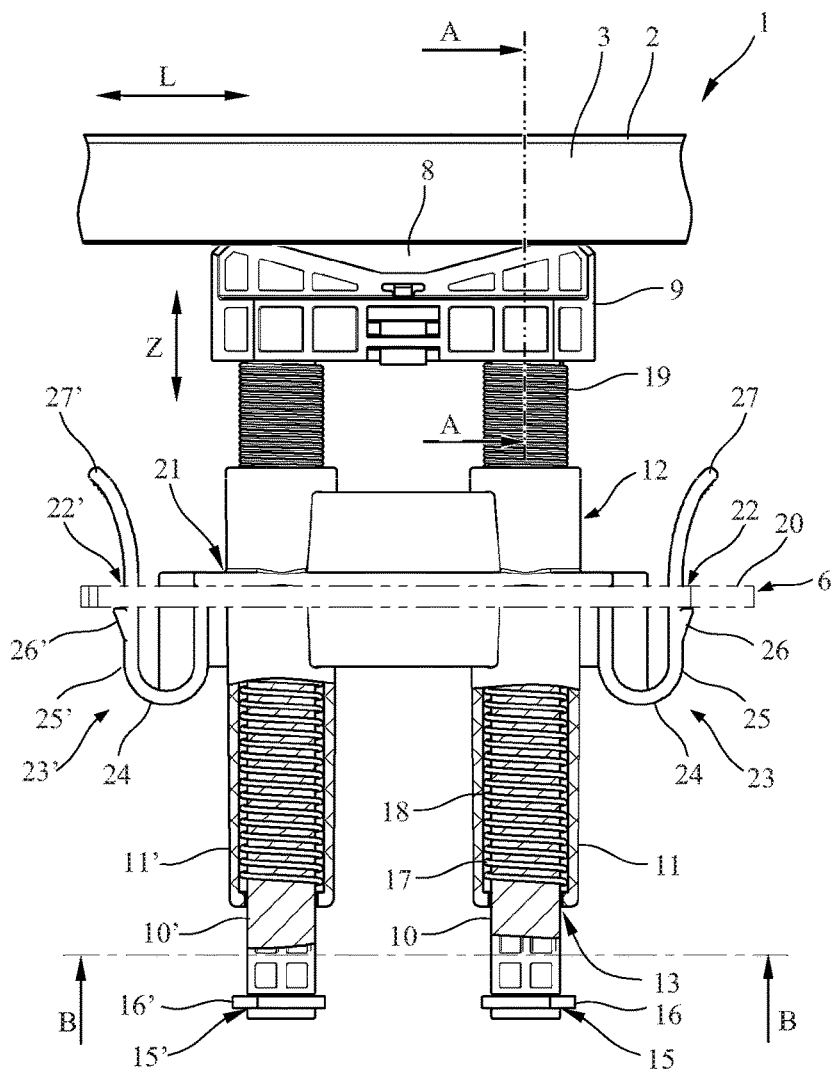
FIG. 3 shows a side view according to FIG. 1 with the current collector in a contacting operating position on the conductor line.
Figure 4:
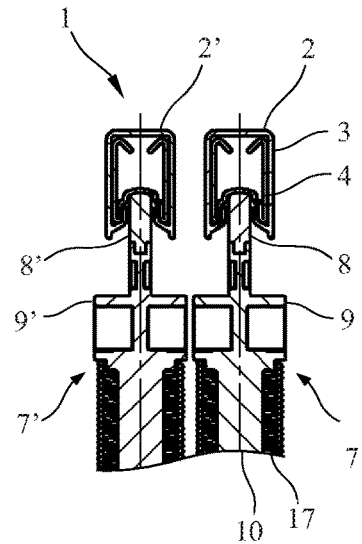
FIG. 4 shows a sectional view through the conductor line and the current collector along line A-A in FIG. 3.
Figure 6:
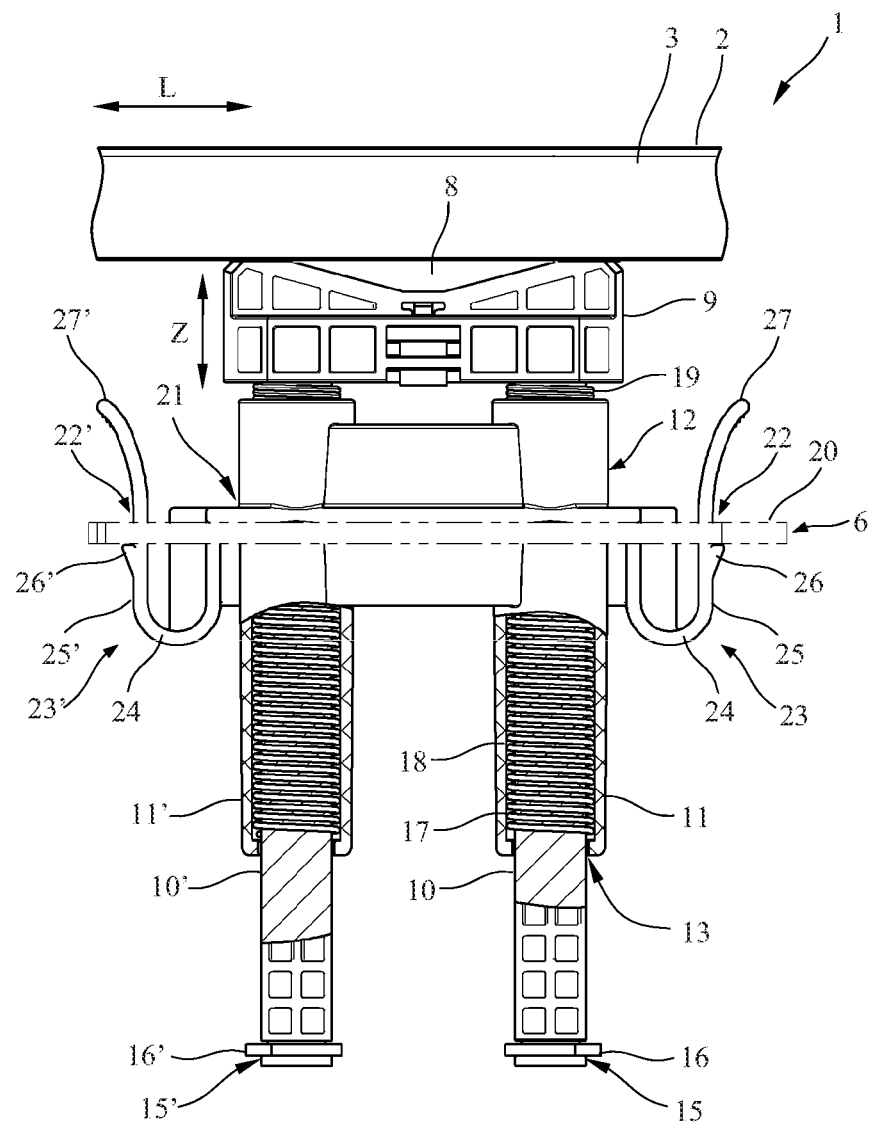
FIG. 6 shows a side view according to FIGS. 1 and 3 with the current collector in the maximally inserted end position.

The current collector 7 has a brush contact 8 preferably designed as a carbon brush, which during operation slides along the sliding surface 5, as depicted in FIGS. 3, 4 and 6. The carbon brush 8 is then connected via an electrical supply line not shown in the drawing to the electrical load and its electrical equipment in order to supply them with electrical current and voltage. A known feed mechanism (not depicted) permits introduction and movement of the entire current collector 7 from and toward the conductor line 2.

The embodiment and method of function described above is known in principle to one skilled in the art and requires no further comments.

In contrast to known current collectors, however, the carbon brush 8 of the current collector 7 according to the disclosure is moved in a different way during operation, continuously in a feed direction Z directed essentially perpendicular to longitudinal direction L toward the conductor line 2 against the sliding surface 5 and forced onto it.

For this purpose, the carbon brush 8 is arranged on a carbon brush support 9, which is preferably formed from an electrically nonconducting material, specifically an electrically insulating material, for example, a hard plastic. The carbon brush support 9 then has guide shafts 10, 10', which are designed identically, arranged one behind the other in the longitudinal direction L. The disclosure is therefore subsequently explained, to the extent possible and necessary, with reference to guide shaft 10. Corresponding comments also apply to the other guide shaft 10', in which corresponding parts are marked using corresponding reference numbers and an additional apostrophe.

Figure 5:
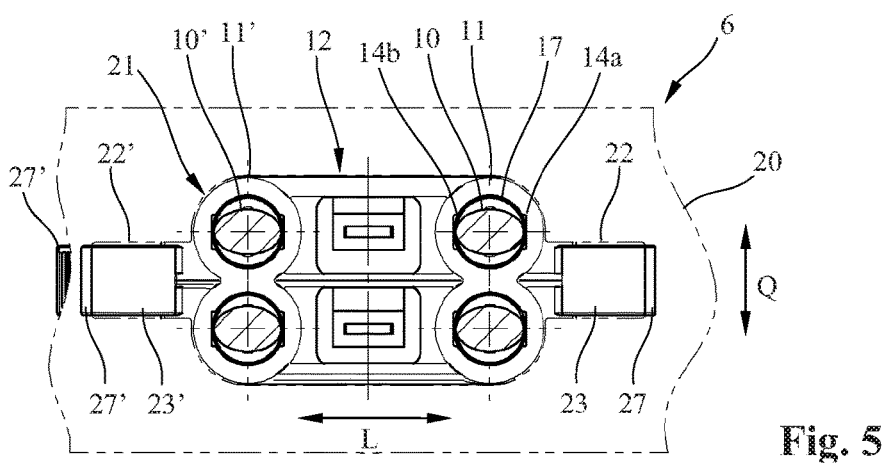
FIG. 5 shows a bottom view of the conductor line system from FIG. 3 along line B-B.

The guide shaft 10 extends in the feed direction Z and has the elliptical cross-section apparent in FIG. 5, the longer axis of the ellipse extending in the longitudinal direction L, whereas the shorter axis extends in a lateral transverse direction Q running across the longitudinal direction L and preferably across the feed direction Z.

The guide shaft 10 engages the electrical load 6 through a hollow cylindrical guide sleeve 11 of a holder 12 of the current collector 7. A guide sleeve 11' provided for the additional guide shaft 10' is again designed accordingly, like guide sleeve 11, such that the comments concerning this apply accordingly.

The guide sleeve 11 preferably has a hollow cylindrical cross-section. On the lower end facing away from the carbon brush 8 in the drawings the guide sleeve tapers to an inward flanged passage opening 13.

Figure 7:
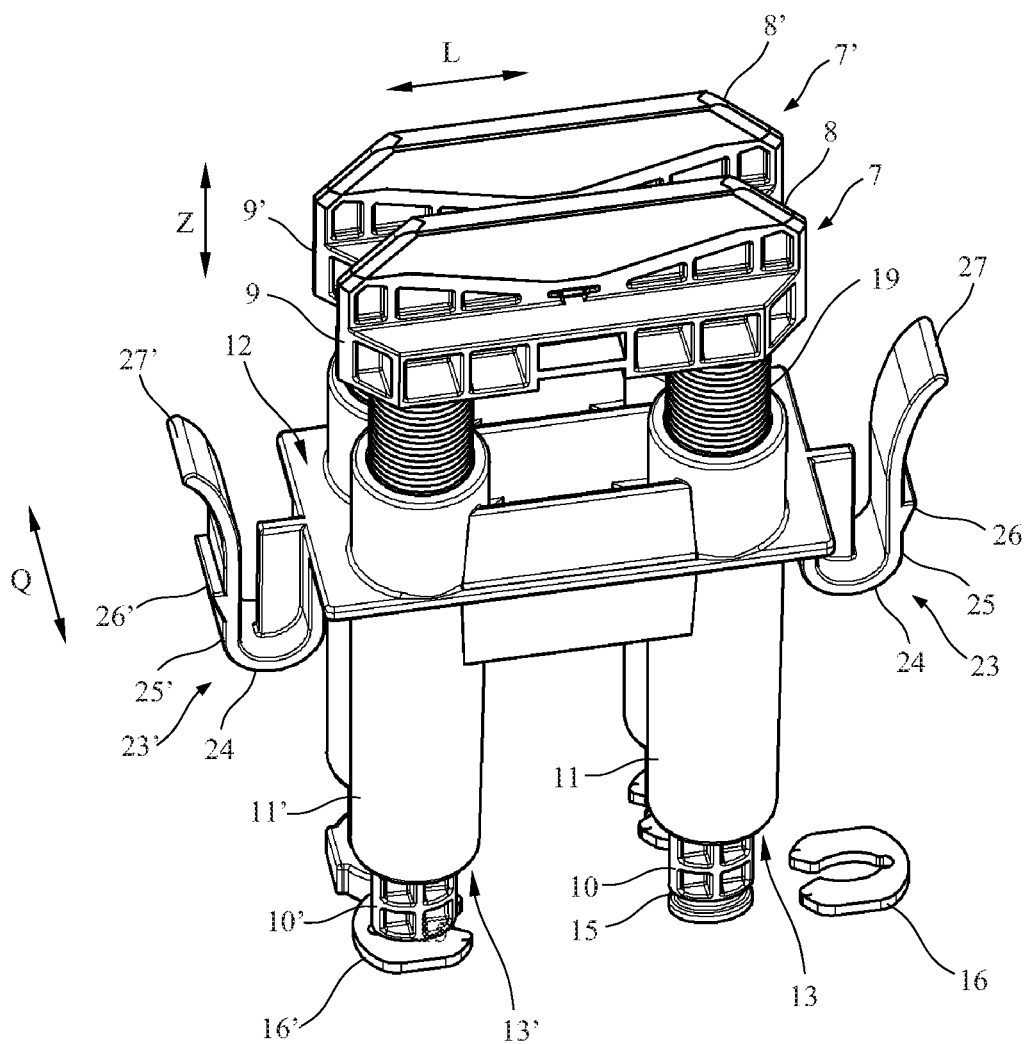
FIG. 7 shows a schematic three-dimensional view of the current collector from FIGS. 1 to 6 in a partially exploded view.

As is readily apparent in FIGS. 1, 3, 6 and 7, on the lower end of the guide shaft 10 facing away from the carbon brush 8, a fully peripheral groove 15 is provided outside the passage opening 13, into which a clamping element 16 open on one side can be pushed. FIG. 7 shows a clamping element 16' on the left side in a position of being fully pushed onto a groove 15, whereas, on the right side the clamping element 16 is depicted before it is pushed on.

The clamping element 16 can preferably be held by means of a snap seat in the groove 15 on the guide shaft 10 such that it is secured against undesired loosening even during operation of the current collector 7. For this purpose, the clamping element 16 has an inner periphery adapted to the elliptical shape of the groove 15 as viewed in the top view so that the clamping element 16 can be pushed on from the narrow side of the groove 15. The two arms of the clamping element 16 are then spread apart somewhat and snapped together again on the end so that sufficient seating of the clamping element 16 in the groove 15 is obtained. An advantage of the elliptical cross-section of the groove 15 is that the arms of the clamping element 16 need not be spread apart so forcefully.

The clamping element 16 also has a large enough outer periphery so that it protrudes laterally beyond the guide shaft 10 and stops against the passage opening 13 on the outside, i.e., on the bottom in the drawings. The clamping element 16 therefore serves as a stop on the outside of the passage opening 13 serving as a counterstop. This prevents the guide shaft 10 from falling out of the guide sleeve 11 in the direction of the conductor line. This is particularly advantageous in a case in which the conductor line 2 and the current collector 7 are mounted horizontally or head first, i.e., rotated by 90° or 180° relative to the position depicted in FIGS. 2 and 4.

Instead of the opening being adapted to the elliptical guide shaft 10 in cross-section as depicted in the practical example, the groove 15 and the clamping element 16 can also have different shapes corresponding to each other. For example, an annular groove can be provided such that the clamping element can be designed as a clamping ring. Instead of the clamping element 16 being made from plastic, other materials that permit elastic movement of the arms of the clamping element can also be used, for example, a metal bracket.

In an alternative embodiment, a washer can also be fastened on the protruding end of the guide shaft by means of a fastening screw, among other things, in which the washer then has a larger diameter than the passage opening 13 and therefore serves as a stop on the outside of the passage opening 13 serving as a counterstop.

The passage opening 13 also has an essentially circular cross-section but has opposite positioning recesses 14a, 14b in the longitudinal direction L.

As is readily apparent in FIG. 5, the longer axis of the elliptical cross-section of the guide shaft 10 is dimensioned in the longitudinal direction L so that it comes to lie in the positioning recesses 14a, 14b and the guide shaft 10 can freely slide through the passage opening 13 with limited longitudinal play ΔL in the longitudinal direction L. The shorter axis of the elliptical cross-section of the guide shaft 10, on the other hand, has a large spacing in the transverse direction relative to the circular cross-section of the guide sleeve 11 enclosing it, and also the passage opening 13 such that high transverse play ΔQ is obtained in the guide sleeve 11. The carbon brush 8 and therefore the carbon brush support 9 is depicted in the drawings in the normal position with reference to the transverse direction Q, i.e., in the position not deflected from the normal position.

The guide shafts 10, 10' are therefore movable in the guide sleeves 11, 11' in the transverse direction Q in the context of transverse play ΔQ so that lateral transverse offset of carbon brush 8 can be compensated for by the transverse play ΔQ of guide shafts 10, 10'.

Through shape-mating of the cross-sections of the guide shaft 10 and the guide sleeve 11 in the longitudinal direction L, a situation can also be advantageously achieved in which the carbon brush 8 is aligned parallel to the longitudinal direction L and therefore to the conducting line 2, and therefore tilting in the conducting line can be avoided.

Instead of the elliptical cross-section of the guide shaft 10 and the corresponding circular cross-section of the guide sleeve 11 and the passage opening 13, other cross-sections adjusted to each other can also be used, in which case it is ensured that the guide shaft 10 has transverse play ΔQ in the transverse direction Q. For example, the guide shaft 10 can have a rectangular cross-section and the guide sleeve 11 can also have a rectangular cross-section in which the cross-sections have only limited longitudinal play ΔL in the longitudinal direction L, whereas the guide sleeve 11 is much wider than the guide shaft 10 in the transverse direction Q in order to provide the highest possible transverse play ΔQ.

It can be advantageous that the high transverse play ΔQ is present especially on the end of the guide sleeve 11 facing the conductor line 2 and the carbon brush 8.

As shown in the operating position in FIGS. 3 and 4 and the maximally inserted operating position in FIG. 6, in order to move or hold the carbon brush 8 in operation continuously in the feed direction Z on the conductor line 2 against the sliding surface 5, spring elements designed here as helical springs 17 and 17' are provided. Since these are identically designed, only a helical spring 17 will be subsequently explained. The comments concerning this apply accordingly to the helical spring 17', the same parts again having the same reference numbers supplemented by an apostrophe.

The helical spring 17 before assembly of the current collector 7 is then placed over the guide shaft 10 and therefore has an inside diameter that is greater than the outside diameter of the guide shaft 10. As is especially apparent in FIG. 5, the helical spring 17 for this purpose therefore has a greater inside diameter than the larger longitudinal axis of the elliptical cross-section of the guide shaft 10. On the other hand, in the transverse direction Q there is a greater distance between the shorter transverse axis of the elliptical cross-section of the guide shaft 10 such that relatively high transverse play ΔQ is provided in the transverse direction between the guide shaft 10 and the helical spring 17.

The guide shaft 10 with the helical spring 17 over it is then pushed into the guide sleeve 11 from the top in the drawings, and the clamping element 16 on the groove 15 is snapped into the end of the guide shaft 10 facing away from the carbon brush 8 extending through the passage opening 13. The helical spring 17 is compressed enough that the guide shaft 10 with the groove 15 protrudes downward through the passage opening 13, as shown, for example, in FIG. 3, 6 or 7.

For this purpose, the helical spring 17 has an outside diameter adjusted to the inside diameter of the hollow cylindrical part of the guide sleeve 11. The inward flanged passage opening 13 then forms a stop on the inside for the helical spring 17 and therefore an abutment that can take up the spring forces of the helical spring 17 when the carbon brush 18 is acted upon with a force from above, for example, when the entire current collector 7 is forced against the conductor line 2 via the feed mechanism (not shown).

As is readily apparent in FIG. 1, the helical spring 17 in the mounted state is designed as a compression spring 18 in a first spring section farther from the carbon brush support 9 and as a tension spring 19 in a second spring section closer to the carbon brush support 9.

On the other hand, the first spring section designed as a compression spring is used such that the carbon brush 18 is continuously moved or forced in the feed direction Z toward the conductor line 2. For this purpose, in the normal position depicted in FIG. 1, the compression spring 18 is already tightened so forcefully, i.e., compressed, that it forces the guide shaft 10 far enough toward the conductor line 2 in the feed direction Z so that the clamping element 16 stops on the outside on the passage opening 13. This ensures that, even with the guide shafts 10, 10' positioned farthest from the guide sleeves 11, 11', sufficient pressure is present to hold the carbon brush 9 always toward the conductor line 2 in the feed direction 2.

The second spring section designed as a tension spring 19 serves mostly to move the carbon brush 8 during lateral deflection in the transverse direction Q by the tension spring 19 back into the middle position stipulated by it with reference to the transverse direction.

FIG. 6 shows the case in which the compression spring 18 is most forcefully tightened, since the carbon brush support 9 lies almost against the upper end of the guide sleeves 11, 11'.

The helical spring 17 can then consist of a one-piece spring with two sections having different spring properties or of two separate helical springs that are connected to each other on one end. With separate helical springs, movable washers or shims can optionally be inserted between them on the guide shaft 10 in the feed direction Z, on which the two springs are mutually supported. With separate helical springs a stop can also be optionally provided for the ends of the two helical springs facing each other.

In order to fasten the holder 12 of the current collector 7 on the electrical load 6, the electrical load 6 has a holding plate 20, which can form part of a housing of the load 6 or an extra support arm provided for this purpose. A large receptacle 21 adapted in cross-section to the shape of the holder 12 as well as the rectangular holding openings 22, 22' attached to it laterally in the longitudinal direction L are provided in the holding plate 20. Holding elements designed as holding clips 23, 23' molded onto the guide sleeves 11, 11' enter the holding openings 22, 22'.

The holding clips 23, 23' then each have a U-shaped bracket 24, 24' running downward in the feed direction Z from the carbon brush 8, whose outer arms 25, 25' lie slightly elastically outward when the current collector 7 inserted in the receptacle 21 is on the outer edge of the holding opening 22, 22'. The outer arms 25, 25' each have outward pointing snap tabs 26, 26', which lie against the inserted holding clips 23, 23' from the bottom on the outer edges of the holding openings 22, 22' and prevent undesired loosening of the current collector 7 from the holding plate 20. The holding clips 23, 23' can be loosened in that the outer arms are designed as handles 27, 27' above the holding openings 22, 22' so that the installer forces them toward the current collector and the snap tabs 26, 26' move inward and therefore disengage from the edges of the holding openings 22, 22' and the current collector 7 can then be removed upward. The holder 12 then also receives the additional current collector 7', in which its components are designed according to the current collector 7 such that the comments concerning this apply accordingly.

In a variant not depicted in the drawing, the carbon brush 8 and the carbon brush support 9 can also be fastened to the holder directly via at least one spring element, specifically a helical or spiral spring without the cooperating guide shafts 10, 10' and the guide sleeves 11, 11' being provided. In this case the spring can preferably be mostly loaded in under tension in order to move the carbon brush 8 from a deflected position back to its normal position.

REFERENCE NUMBERS

1 Conductor line system
2, 2' Conductor lines
3 Insulation profile
4 Phase conductor profile
5 Sliding surface
6 Electrical load
7, 7' Current collector
8, 8' Carbon brush
9, 9' Carbon brush support
10, 10' Guide shafts (guide element)
11, 11' Guide sleeves (guide)
12 Current collector holder
13, 13' Passage opening (counterstop)
14a, 14b Positioning recesses
15, 15' Groove
16, 16' Clamping element (stop)
17 Helical spring (spring element)
18 Compression spring (first spring section)
19 Tension spring (second spring section)
20 Holding plate movable load
21 Receptacle for holding the current collector
22, 22' Holding openings
23, 23' Holding element (holding clip)
24, 24' Elastic U-shaped bracket
25, 25' Outer arms of U-shaped bracket
26, 26' Snap tab
27, 27' Handle
Z Feed direction of carbon brush
L Longitudinal direction of conductor line
Q Transverse direction
ΔQ Transverse play of guide shaft
ΔL Longitudinal play of guide shaft

The invention claimed is:
1. A current collector to supply an electrical load movable along a conductor line in a longitudinal direction of the conductor line, the current collector comprising:

a holder and a carbon brush arranged in a carbon brush support movable relative to the holder in a feed direction from and to conductor line, wherein the carbon brush is additionally movable in a transverse direction running essentially across the longitudinal direction, a spring element being provided between the carbon brush and the holder, wherein the carbon brush and/or the carbon brush support has at least one guide element extending in the feed direction, wherein play in the transverse direction exists between the guide element and the spring element, wherein the spring element encloses the guide element, and wherein the spring element and the guide element have a different cross-section from each other, in which the distance between the guide element and the spring element in the transverse direction is greater than in the longitudinal direction.

2. The current collector of claim 1, wherein the spring element acts in a first spring section mostly in the feed direction and/or under compression.

3. The current collector of claim 1, wherein the spring element has first and second spring sections and the spring element acts in a second spring section mostly in the transverse direction and/or under tension.

4. The current collector of claim 3, wherein the second spring section lies closer to the carbon brush than the first spring section.

5. The current collector of claim 1, wherein the guide element is movable in a guide of the holder in the feed direction.

6. The current collector of claim 5, wherein a stop of the guide element coincides with a counterstop of the guide lying closer to the carbon brush in the feed direction.

7. The current collector of claim 1, wherein the play in the transverse direction is greater than play between the guide element and the spring element in the longitudinal direction.

8. The current collector of claim 1, wherein the spring element has a circular cross-section and the guide element has a cross-section that deviates from circular.

9. The current collector of claim 1, wherein the width of the guide element in the transverse direction is less than the length of the guide element in the longitudinal direction.

10. The current collector of claim 1, wherein the spring element is arranged at least partially in the guide and supported on at least one side on the holder.

11. A conductor line system comprising a conductor line and the current collector of claim 1.

* * * * *